(12) United States Patent
Yamashita

(10) Patent No.: US 6,614,472 B1
(45) Date of Patent: Sep. 2, 2003

(54) SOLID STATE IMAGE PICKUP DEVICE DRIVING METHOD, MEASUREMENT METHOD AND MEASUREMENT APPARATUS

(75) Inventor: Mitsuru Yamashita, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/088,738

(22) Filed: Jun. 2, 1998

(30) Foreign Application Priority Data

Jun. 3, 1997 (JP) .......................... P09-144819

(51) Int. Cl.$^7$ ............. H04N 9/64; H04N 3/14; H04N 5/335
(52) U.S. Cl. ............ 348/243; 348/320; 348/249
(58) Field of Search ............... 348/175, 187, 348/241, 242, 243, 244, 245, 320, 311, 322, 248, 249

(56) References Cited

U.S. PATENT DOCUMENTS

| | | | | |
|---|---|---|---|---|
| 5,025,319 A | * | 6/1991 | Mutoh et al. ............... | 348/322 |
| 5,049,996 A | * | 9/1991 | Kaneko et al. ............. | 348/230.1 |
| 5,128,767 A | * | 7/1992 | Suzuki et al. .............. | 348/241 |
| 5,216,511 A | * | 6/1993 | Tani ........................... | 348/243 |
| 5,379,063 A | * | 1/1995 | Kishi et al. ................ | 348/241 |
| 5,546,127 A | * | 8/1996 | Yamashita et al. .......... | 348/322 |

FOREIGN PATENT DOCUMENTS

| | | | | |
|---|---|---|---|---|
| JP | 05292393 A | * | 11/1993 | .......... H04N/5/262 |
| JP | 08338953 A | * | 12/1996 | .......... G02B/23/24 |

* cited by examiner

Primary Examiner—Wendy R. Garber
Assistant Examiner—John M. Villecco
(74) Attorney, Agent, or Firm—Sonnenschein, Nath & Rosenthal

(57) ABSTRACT

There has been raised a problem of how to make the measurement of characteristics of a solid state image pickup device easy to carry out, to shorten the measurement time and to increase the measurement accuracy. In order to solve the problem described above, the solid state image pickup device is operated to generate an output with an operating condition for an odd field made different from that for an even field. For example, a dark signal can be detected with the supply of read pulses for either odd or even fields halted typically at the same time as a playback signal is detected in a state of being shielded from light or a state of applying an incident light with a predetermined quantity. As a result, it is possible not only to measure a variety of characteristics merely under a plurality of conditions at the same time but also to further process outputs of the odd and even fields in order to measure still another characteristic such as a dark current generated by an image pickup area.

5 Claims, 3 Drawing Sheets

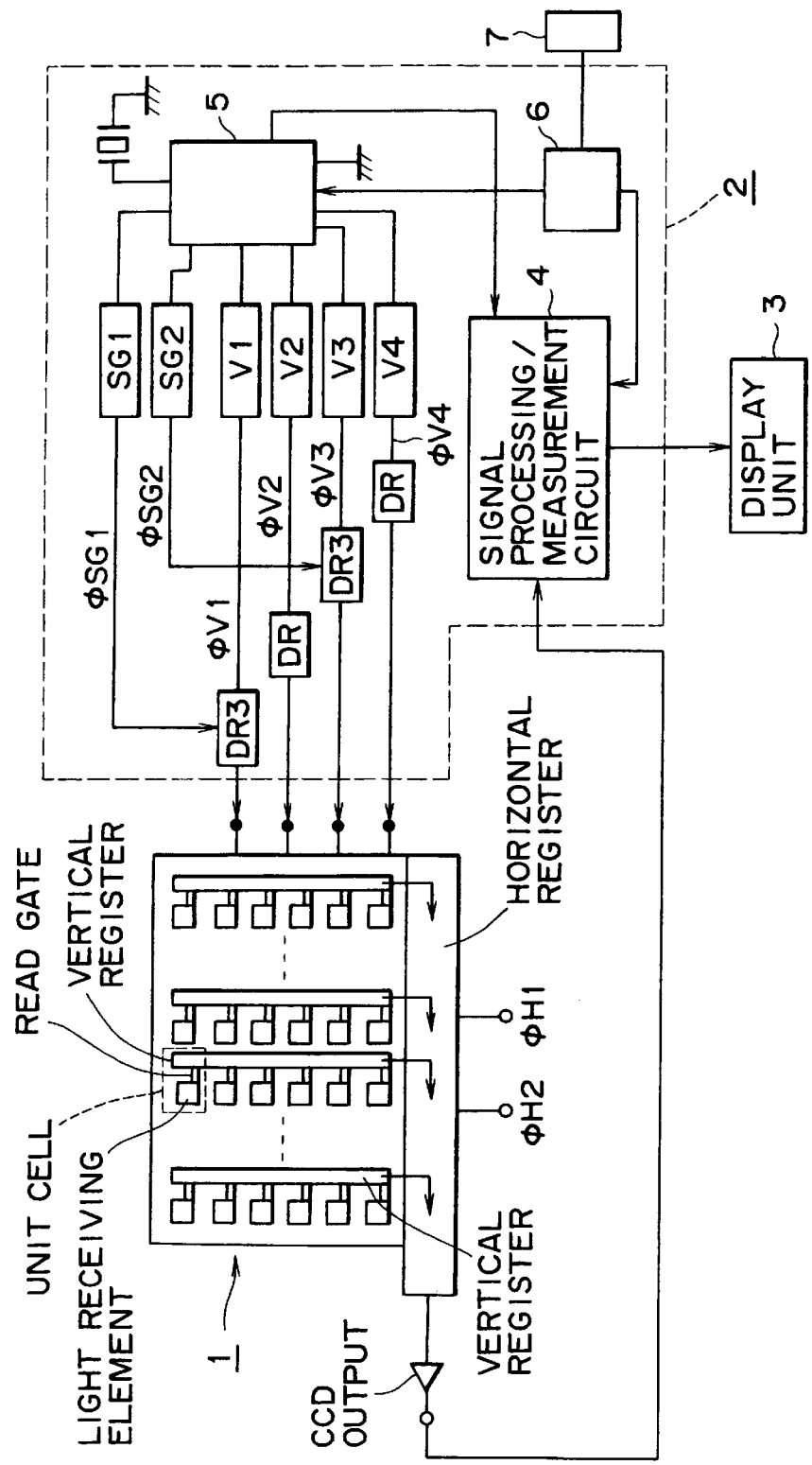

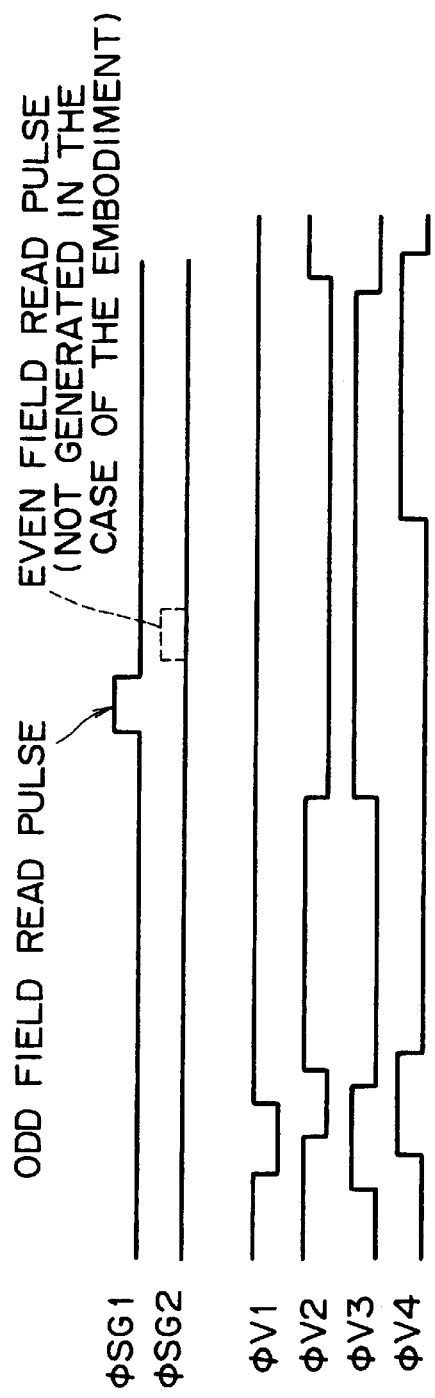
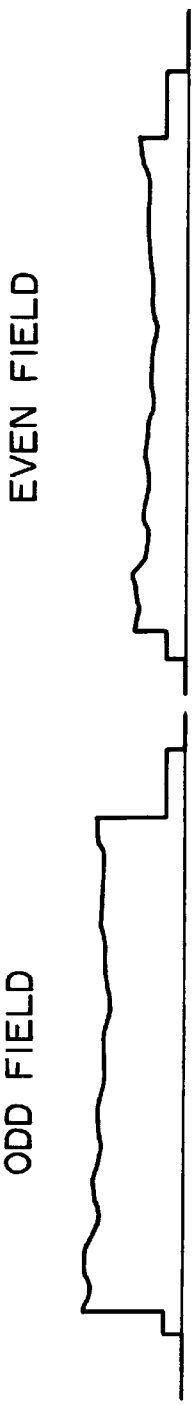

FIG. 2
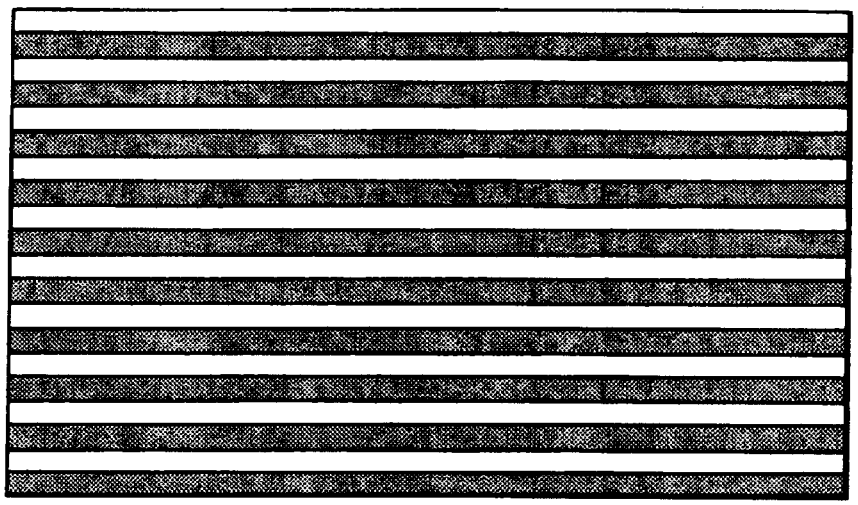
 : ODD FIELD
 : EVEN FIELD

SOLID STATE IMAGE PICKUP DEVICE DRIVING METHOD, MEASUREMENT METHOD AND MEASUREMENT APPARATUS

BACKGROUND OF THE INVENTION

The present invention relates to a driving method, a measurement method and a measurement apparatus of a solid state image pickup device.

A solid state image pickup device is widely used as an image pickup means in a variety of cameras such as electronic still cameras, home video cameras and various business video cameras including broadcasting station cameras. Demanded characteristics and demanded performance of a camera vary from application to application. Nevertheless, there is no difference from semiconductor devices of other types in that it is necessary to measure and evaluate a solid state image pickup device in order to form a judgment as to whether or not the solid state image pickup device has the required characteristics and the required performance. In addition, there is a large number of characteristics that need to be measured and evaluated. For example, levels of various dark signals.are specially important characteristics that need to be measured and evaluated.

In the conventional measurement of a solid state image pickup device, when the measurement of an item of measurement is completed, the measurement of a next item of measurement is started. In the conventional measurement, a result of measurement is thus found for each item of measurement of the solid state image pickup device which is measured with timing different from item to item. A variety of measurement results are then processed to find characteristics of another item or another kind.

As an example, the following description explains the conventional general method of measurement and evaluation of the level of a dark signal in a CCD solid state image pickup device. A dark signal of the CCD solid state image pickup device is measured with the device driven by using the ordinary driving method to operate in a state of being shielded from light to read out data from a frame or a field. Then, a dark signal generated by portions of the CCD solid state image pickup device other than a sensor unit (that is, an image pickup area) is measured by putting the device in a state allowing an operation to read out data with a supply of particular read pulses halted. Examples of the portions other than the image pickup area are vertical and horizontal registers. Finally, an output of the read operation with a supply of particular read pulses halted is subtracted from an output of the read operation driven by using the ordinary driving method in a state of being shielded from light in order to find a dark signal generated by the sensor unit.

By the way, in the conventional measurement method described above whereby a result of measurement is found for each item of measurement of a solid state image pickup device measured with timing different from item to item and a variety of measurement results are then processed to find characteristics of another item or another kind, a manual operation is required each time a driving condition is changed, giving rise to a problem that the measurement work is cumbersome and that it takes a long time to complete the measurements.

In addition, there is also raised a problem that, since the magnitude of the dark signal itself is typically small and variations in magnitude due to changes in temperature are relatively big, the measurement is prone to big errors caused by changes in measurement conditions which are attributed to the changes in temperature. For example, a dark signal of portions other than the sensor unit is normally measured after a period of time has lapsed since the measurement of a completely dark signal. If the temperature changes during the period of time, the change in temperature will cause a big error in a dark signal of the sensor unit which is found by subtracting the dark signal generated by the portions other than the sensor unit from the completely dark signal.

SUMMARY OF THE INVENTION

It is thus an object of the present invention addressing the problems described above to make the measurement of a solid state image pickup device easy to carry out, to shorten the measurement time and to improve the measurement accuracy.

The present invention is characterized in that the solid state image pickup device is operated to generate an output with an operating condition for an odd field made different from that for an even field or, in other words, such an operation of the solid state image pickup device is a characteristic of the present invention.

As a result, according to the present invention, it is possible to obtain information on a variety of characteristics of a solid state image pickup device or to measure the characteristics at the same time in a state with different operating conditions applied such as a playback state.

In particular, a dark signal can be detected with the supply of read pulses for either odd or even fields halted typically at the same time as a playback signal is detected in a state of being shielded from light or a state of applying an incident light with a predetermined quantity. It is thus possible not only to measure a variety of characteristics merely under a plurality of conditions at the same time but also to further process outputs of the odd and even fields in order to measure still another characteristic such as a dark current generated by an image pickup area.

As described above, the present invention is characterized in that the solid state image pickup device is operated to generate an output with an operating condition for an odd field made different from that for an even field or, in other words, such an operation of the solid state image pickup device is a characteristic of the present invention. A CCD solid state image pickup device is a typical solid state image pickup device to which the present invention is applied. It should be noted, however, that the scope of the present invention is not limited to such a CCD solid state image pickup device. That is to say, the present invention can also be applied to any solid state image pickup device as long as the device is capable of carrying out interlace operations. Examples of devices to which the present invention can be applied are a MOS solid state image pickup device and an amplification type solid state image pickup device. As for the CCD solid state image pickup device, the present invention can be applied to both the interline and interframe types. In addition, the present invention can also be applied to an image pickup device wherein an array of sensors such as linear sensors is divided into 2 portions allocated to odd field pixels and even field pixels and data is read out from both the portions.

In the most typical technique of making an operating condition for an odd field made different from that for an even field, an operation to read out pixel data from either the odd or even field to a vertical register is halted. It should be noted, however, that the scope of the method provided by the present invention is not limited to such a technique. For example, the frequencies of driving pulse signals for the odd and even fields, that is, the horizontal transfer pulse signal and the vertical transfer pulse signal, are made different from each other and the amount of unnecessary radiation at one of the frequencies is measured.

BRIEF DESCRIPTION OF THE DIAGRAMS

An embodiment of the present invention will be described by referring to the following diagrams wherein:

FIGS. 1A to 1C are each an explanatory diagram used for describing an embodiment of the present invention; to be more specific, FIG. 1A is a block diagram showing a CCD solid state image pickup device, the characteristics of which are being measured and evaluated, and a measurement apparatus; FIG. 1B is a diagram showing waveforms of a read pulse and a vertical transfer pulse; and FIG. 1C is a diagram showing waveforms of outputs of odd and even fields; and FIG. 2 is a diagram showing an image reproduced by the embodiment.

DETAILED DESCRIPTION OF THE PREFERRED EMBODIMENT

The present invention will become more apparent from a careful study of the following detailed description of a preferred embodiment with reference to the accompanying diagrams. FIGS. 1A to 1C are each an explanatory diagram used for describing the embodiment of the present invention. To be more specific, FIG. 1A is a block diagram showing a CCD solid state image pickup device, the characteristics of which are being measured and evaluated, and a measurement apparatus. FIG. 1B is a diagram showing waveforms of a read pulse and a vertical transfer pulse. FIG. 1C is a diagram showing waveforms of outputs of odd and even fields.

In FIG. 1, reference numeral 1 denotes the CCD solid state image pickup device, strictly speaking, an interline CCD solid state image pickup device, the characteristics of which are being measured and evaluated, whereas reference numeral 2 denotes the measurement apparatus for measuring the characteristics of the CCD solid state image pickup device 1. The measurement apparatus 2 drives the CCD solid state image pickup device 1, then carries out various kinds of measurement by processing a signal output by the CCD solid state image pickup device 1 and, finally, lets the CCD solid state image pickup device 1 output an image to a display unit 3. The measurement apparatus 2 comprises drivers DR to DR3, a signal processing/measurement circuit 4, a control unit 5 and a controller 6. The signal processing/measurement circuit 4 carries out the various kinds of measurement by processing the signal output by the CCD solid state image pickup device 1 and lets the CCD solid state image pickup device 1 output an image to the monitor display unit 3. The control unit 5 controls, among other components, read pulse generating units SG1 and SG2 for generating read pulse signals φSG1 and φSG2 respectively which are used for driving the CCD solid state image pickup device 1. In addition, the control unit 5 also controls vertical transfer pulse generating units V1 to V4 for generating vertical transfer pulse signals φV1 to φV4 respectively which are also used for driving the CCD solid state image pickup device 1. The drivers DR to DR3 are each a driver. In particular, the driver DR3 is a 3-state driver for enabling a read operation. It should be noted that, horizontal transfer pulse generating units for generating horizontal transfer pulse signals φH1 and φH2 are not shown in the figure because there is no difference from the horizontal transfer pulse generating units employed in the conventional measurement apparatus.

The controller 6 controls the entire measurement apparatus 2. Reference numeral 7 is an input means such as a keyboard and a mouse.

In the present embodiment, measurement is carried out by letting the CCD solid state image pickup device 1 perform no read operations for even fields as shown in FIG. 1B. In an ordinary operation, vertical transfers by vertical registers are generally accomplished by the vertical transfer pulse signals φV1 to φV4 and a read operation is carried out by superposing a read pulse φSG1 or φSG2 on the pulse φV1 or φV3 respectively. To put it concretely, the read pulses φSG1 and φSG2 are generated as shown by solid and dashed lines respectively in FIG. 1B. When the read pulses φSG1 and φSG2 are generated, operations to read out signals from pixels and transfer the signals to the vertical registers are carried out.

In the case of the present embodiment, on the other hand, a read pulse signal φSG2 for letting a read operation be carried out for an even field is not generated. That is to say, the read pulse generating unit SG2 is not driven to generate the read pulse signal φSG2. In this case, the waveforms of signals output by the CCD solid state image pickup device 1 are shown in FIG. 1C. As shown in the figure, for an odd field, the level of the output signal depends on the quantity of an incident light. For an even field, on the other hand, the level of the output signal is low independently of the amount of signal electric charge accumulated in light receiving elements of pixels which depends on the quantity of an incident light for the even field. The level of the output signal for an even field represents a dark signal generated by portions other than the device pickup area such as vertical and horizontal registers.

FIG. 2 is a diagram showing a reproduced image appearing on the monitor display unit 3. In the measurement apparatus 2, output signals generated by the CCD solid state image pickup device 1 are sequentially read in one after another. Data of odd and even fields is classified by field, being separated from each other and properly utilized for measuring, analyzing and evaluating characteristics of the CCD solid state image pickup device 1.

By letting the CCD solid state image pickup device 1 operate under the ordinary condition for an odd field and carry out no operation to read out data from light receiving elements of pixels and transfer the data to vertical registers for an even field as described above, characteristics of the CCD solid state image pickup device 1 can be measured under the two different conditions applied at the same time. To put it in detail, an output generated by a certain specific quantity of incident light and an output representing a dark signal generated by portions other than the image pickup area can be detected at the same time.

In addition, when the CCD solid state image pickup device is put in a state of being shielded from light, a level corresponding to a completely dark signal is observed for the odd fields whereas a dark signal generated by the portions other than the image pickup area is output for the even fields. The difference between them is a dark signal generated by the image pickup area in itself. Thus, by letting the signal processing/measurement circuit employed 4 in the measurement apparatus 2 compute this difference, a dark signal generated by the image pickup area can be found. In addition, the dark signal generated by the image pickup area represents the degree of contrast between odd fields and even fields on the screen of the monitor display unit 3, and the magnitude of the dark signal generated by the image pickup area can be known by visually observing the degree of contrast appearing on the display screen.

On the top of that, since odd and even fields can be played back on the same frame at the same time, it is possible to obtain data representing a picture with accuracy excluding variations caused by changes in operating environment such as changes in temperature. For example, when the dark currents vary due to changes in temperature, the dark currents are compared with each other to provide a difference between them which is reflected in an image excluding variations caused by the changes in temperature. In the conventional measurement method, a completely dark signal is measured prior to measurement of a dark signal generated by the portions other than image pickup area. Thus, there is a time gap between the two measurement processes and, if the temperature changes during the time gap, a dark signal generated by the image pickup area found from a difference in output between the two measurement processes will have poor accuracy. In the case of the present embodiment, on the other hand, since there is no such a time gap, it is possible to find a dark signal generated by the image pickup area with a high degree of accuracy.

In addition, according to the present embodiment, it is possible to make the measurement of characteristics of the solid state image pickup device easy to carry out, to shorten the measurement time and to increase the measurement accuracy.

It should be noted that, as a technique of making an operating condition for an odd field made different from that for an even field, the frequencies of driving pulse signals for the odd and even fields, that is, the horizontal transfer pulse signal and the vertical transfer pulse signal, are made different from each other and the amount of unnecessary radiation for the frequencies is measured.

The present invention is characterized in that the solid state image pickup device is operated to generate an output with an operating condition for an odd field made different from that for an even field or, in other words, such an operation of the solid state image pickup device is a characteristic of the present invention. Thus, according to the present invention, it is possible to obtain information on a variety of characteristics of a solid state image pickup device or to measure the characteristics at the same time in a state with different operating conditions applied such as a playback state.

As a result, it is possible to make the measurement of characteristics of the solid state image pickup device easy to carry out, to shorten the measurement time and to increase the measurement accuracy.

What is claimed is:

1. A method of driving a solid state image pickup device comprising:
    a light receiving element for carrying out photoelectrical conversion,
    a signal electric charge transferring unit for transferring total signal electric charge comprising signal electric charge generated by said light receiving element and a dark current generated by said signal electric charge transferring unit itself; and
    a read/transfer operation control unit for controlling operations to read out said signal electric charge generated by said light receiving element from said light receiving element to said signal electric charge transferring unit and transfer said signal electric charge in said signal electric charge transferring unit, whereby,
    signal electric charge generated by said light receiving element for an odd field is read out from said light receiving element to said signal electric charge transferring unit and transferred in said signal electric charge transferring unit in an operating condition different from an operation condition in which signal electric charge generated by said light receiving element for an even field is read out from said light receiving element to said signal electric charge transferring unit and transferred in said signal electric charge transferring unit in order to produce outputs for forming an image of 1 frame; and whereby,
    said operating condition for reading out signal electric charge generated by said light receiving element for an odd field from said light receiving element to said signal electric charge transferring unit and transferring said signal electric charge in said signal electric charge transferring unit is made different from said operating condition for reading out signal electric charge generated by said light receiving element for an even field from said light receiving element to said signal electric charge transferring unit by halting the supply of read pulses for either said odd field or said even field.

2. A method of driving a solid state image pickup device comprising:
    a light receiving element for carrying out photoelectrical conversion,
    a signal electric charge transferring unit for transferring total signal electric charge comprising signal electric charge generated by said light receiving element and a dark current generated by said signal electric charge transferring unit itself; and
    a read/transfer operation control unit for controlling operations to read out said signal electric charge generated by said light receiving element from said light receiving element to said signal electric charge transferring unit and transfer said signal electric charge in said signal electric charge transferring unit, whereby,
    signal electric charge generated by said light receiving element for an odd field is read out from said light receiving element to said signal electric charge transferring unit and transferred in said signal electric charge transferring unit in an operating condition different from an operation condition in which signal electric charge generated by said light receiving element for an even field is read out from said light receiving element to said signal electric charge transferring unit and transferred in said signal electric charge transferring unit in order to produce outputs for forming an image of 1 frame; and whereby,
    said operating condition for reading out signal electric charge generated by said light receiving element for an odd field from said light receiving element to said signal electric charge transferring unit and transferring said signal electric charge in said signal electric charge transferring unit is made different from said operating condition for reading out signal electric charge generated by said light receiving element for an even field from said light receiving element to said signal electric charge transferring unit and transferring said signal electric charge in said signal electric charge transferring unit by putting said light receiving element for said light receiving element for said even fields in a read disable state, or putting said light receiving element for said even fields in a read enable state while putting said light receiving element for said odd fields in a read disable state by halting the supply of read pulses for either said odd field or said even field.

3. A method of measuring characteristics of a solid state image pickup device comprising:

a light receiving element for carrying out photoelectrical conversion, a signal electric charge transferring unit for transferring total signal electric charge comprising signal charge generated by said light receiving element and a dark current generated by said signal electric charge transferring unit itself; and a read/transfer operation control unit for controlling operations to read out said signal electric charge generated by said light receiving element from said light receiving element to said signal electric charge transferring unit and transfer said signal electric charge in said signal electric charge transferring unit, whereby, signal electric charge generated by said light receiving element for an odd field is read out from said light receiving element to said signal electric charge transferring unit and transferred in said signal electric charge transferring unit with timing adjusted to operations to read out signal electric charge generated by said light receiving element for an even field from said light receiving element to said signal electric charge transferring unit and transfer said electric charge in said signal electric charge transferring unit in order to produce outputs for measuring characteristics of said solid state image pickup device but in an operating condition different from an operating condition in which said signal electric charge generated by said light receiving element for an even field is read out from said light receiving element to said signal electric charge transferring unit and transferred in said signal electric charge transferring unit; and whereby, said operating condition for reading out signal electric charge generated by said light receiving element for an odd field from said light receiving element to said signal electric charge transferring unit and transferring said signal electric charge in said signal electric charge transferring unit is made different from said operating condition for reading out signal electric charge generated by said light receiving element for an even field from said light receiving element to said signal electric charge transferring unit and transferring said signal electric charge in said signal electric charge transferring unit by halting the supply of read pulses for either said odd field or said even field.

4. A method of measuring characteristics of a solid state image pickup device comprising:

a light receiving element for carrying out photoelectrical conversion, a signal electric charge transferring unit for transferring total signal electric charge comprising signal electric charge generated by said light receiving element and a dark current generated by said signal electric charge transferring unit itself; and a read/transfer operation control unit for controlling operations to read out said signal electric charge generated by said light receiving element from said light receiving element to said signal electric charge transferring unit and transfer said signal electric charge in said signal electric charge transferring unit, whereby, signal electric charge generated by said light receiving element for an odd field is read out from said light receiving element to said signal electric charge transferring unit and transferred in said signal electric charge transferring unit with timing adjusted to operations to read out signal electric charge generated by said light receiving element for an even field from said light receiving element to said signal electric charge transferring unit and transfer said electric charge in said signal electric charge transferring unit in order to produce outputs for measuring characteristics of said solid-state image pickup device but in an operating condition different from an operating condition in which said signal electric charge generated by said light receiving element for an even field is read out from said light receiving element to said signal electric charge transferring unit and transferred in said signal electric charge transferring unit, and said operating condition for reading out signal electric charge generated by said light receiving element for an odd field from said light receiving element to said signal electric charge transferring unit and transferring said signal electric charge in said signal electric charge transferring unit is made different from said operating condition for reading out signal electric charge generated by said light receiving element for an even field from said light receiving element to said signal electric charge transferring unit and transferring said signal electric charge in said signal electric charge transferring unit by putting said light receiving element for said light receiving element for said even fields in a read disable state, or putting said light receiving element for said even fields in a read enable state while putting said light receiving element for said odd fields in a read disable state by halting the supply of read pulses for either said odd field or said even field.

5. A method of measuring characteristics of a solid state image pickup device according to claim 4 whereby, with said solid state image pickup device put in a state of being shielded from light, said solid state image pickup device is driven under an operating condition for an odd field different from an operating condition for an even field and a difference in output between signals generated for said odd and even fields is found.

* * * * *